United States Patent Office 3,325,517
Patented June 13, 1967

3,325,517
STEROID AMINOGUANIDINES AND THEIR PRODUCTION
Karlheinz Meyer and Siegismund Schütz, Wuppertal-Elberfeld, Kurt Stoepel, Wuppertal-Vohwinkel, and Hans-Günther Kroneberg, Haan, Rhineland, Germany, assignors to Farbenfabriken Bayer Aktiengesellschaft, Leverkusen, Germany, a corporation of Germany
No Drawing. Filed Jan. 6, 1965, Ser. No. 425,110
Claims priority, application Germany, Jan. 7, 1964, F 41,679; Apr. 16, 1964, F 42,620
15 Claims. (Cl. 260—397)

The present invention relates to steroid aminoguanidines and their production. These steroid aminoguanidines include compounds substituted in the aminoguanidine radical or moiety as well as those which are unsubstituted in the aminoguanidine radical or moiety. The steroid aminoguanidines of this invention are cardioactive, i.e., they are useful as cardiotonics as such or in the form of their salts with non-toxic organic and inorganic acids.

Application Ser. No. 237,724, filed Nov. 14, 1962, and abandoned in favor of continuation-in-part Ser. No. 319,583, filed Oct. 28, 1963, now U.S. Patent 3,251,863, describes procedure for producing steroid guanylhydrazones of the androstane and pregnane series from steroids having more than one carbonyl function.

Application Ser. No. 337,713, filed Jan. 15, 1964, describes the preparation of steroid guanylhydrazones unsubstituted in the aminoguanidine radical or moiety.

It has now been found that cardio-active compounds can also be obtained by converting the above steroid guanylhydrazones or their salts into steroid aminoguanidines and further by converting such steroid guanylhydrazones which are substituted in the aminoguanidine radical or moiety, or their salts, into steroid aminoguanidines which are correspondingly substituted in the aminoguanidine radical or moiety.

According to one phase of the invention the new compounds are produced by hydrogenating steroid guanylhydrazones of the androstane and pregnane series, or their salts, in a manner per se known in the presence of a suitable catalyst. Dependent upon the starting product, the corresponding aminoguanidines are thus formed, and further groupings capable of hydrogenation, which are present in the steroid molecule, can be hydrogenated at the same time. The process is preferably carried out in acetic acid with platinum oxide as catalyst.

According to a further phase of the invention, the desired compounds are prepared by reacting steroids of the androstane and pregnane series having more than one carbonyl function with aminoguanidines of the formula:

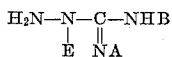

or their salts, in a manner per se known, wherein A and E are each hydrogen or a branched, straight chain or alicyclic alkyl chain of 1–6 carbon atoms which can be substituted by one or more hydroxyl groups; B is hydrogen, a mono- or poly-hydroxy substituted or unsubstituted, branched or straight chain or alicyclic chain of 1 to 6 carbon atoms, which also, if necessary, via a heteroatom such as N, O or S, can be linked with A, nitro, amino or a basic residue of the formula D,

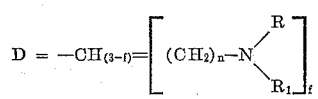

wherein $n=0$ to 8 and $f$ can be 1 or 2; and R and $R_1$ at times stand for hydrogen, for the same or different mono- or poly-hydroxy substituted or unsubstituted branched, straight chain or alicyclic alkyl groups of up to 6 carbon atoms which, if necessary also via a heteroatom such as N, S or O, can be linked with one another; or their salts, by hydrogenating in the presence of a suitable catalyst in a manner per se known. Dependent upon the starting product, corresponding substituted aminoguanidines result, whereby simultaneously additional available hydrogenatable groups in the steroid molecule can be hydrogenated. One works preferably in acetic acid with platinum oxide as catalyst.

Raney nickel is methanol is especially suitable for partial hydrogenation in both phases of the invention. In this way it is possible, for examplere, to hydrogenate partially the dihydrochloride of pregn-4-ene-3,20-bis-guanyl-hydrazone, i.e., only the double bond in the ring A and one C, N double bond (presumably in the 3-position) are hydrogenated, whereas the second guanyl-hydrazone grouping is retained.

Suitable organic and inorganic acids are, for example, acetic acid, propionic acid, maleic acid, fumaric acid, succinc acid, tartaric acid, citric acid, salicyclic acid, naphthalene-1,5-disulphonic acid, hydrochloric acid, phosphoric acid, etc.

Suitable starting materials for a processing according to the invention are, for example, the substituted and unsubstituted 3,20-bis-guanylhydrazones (in the form of their salts) of:

12α-hydroxyprogesterone;
18-nor-progesterone;
D-homoprogesterone;
15α-hydroxyprogesterone;
D-nor-progesterone;
6α- and 6β-hydroxyprogesterone;
19-hydroxyprogesterone;
B-nor-progesterone;
11,21-dihydroxyprogesterone;
9α-halogen-corticosterone;
9α-halogen-cortisone;
cortisone;
hydrocortisone;
prednisone;
prednisolone;
6α-halogen-16α,17α-dihydroxy-progesterone;
6α-methyl-16α,17α-dihydroxy-progesterone;
12α-halogen-cortisone;
9α-halogen-hydro-cortisone;
12α-hydroxyprogesterone;
12α-halogen-hydro-cortisone;
16α-hydroxy-cortisone;
16α-hydroxy-prednisone;
16α-hydroxy-predisolone;
9α-halogen-16α-hydroxy-cortisone;
12α-halogen-16-hydroxy-hydrocortisone;
12α-halogen-16-hydroxy-cortisone;
6α-methyl-16α-hydroxy-cortisone;
6α-methyl-16α-hydroxy-prednisolone;
6α-methyl-16α-hydroxy-prednisone;
2α-methyl-16α-hydroxycortisone;
2α-methyl-16α-hydroxy-hydrocortisone;
2-methyl-16α-hydroxy-prednisolone;
2-methyl-16α-hydroxy-predisone;
2α,6α-dimethyl-16α-hydroxy-hydrocortisone;
2α,6α-dimethyl-16α-hydroxy-cortisone;
9α-halogen-2-methyl-16α-hydroxy-prednisolone;
9α-halogen-6α-methyl-16α-hydroxy-cortisone;
9α-halogen-6α-methyl-16α-hydroxy-prednisolone;
16-hydroxy-6-dihydrocortisone;
16-hydroxy-6-dehydro-hydrocortisone;
16α-hydroxy-6-dehydro-prednisolone;
9α-halogen-16α-hydroxy-6-dehydro-prednisolone;
1β,16α,17α-trihydroxy-progesterone;
11-keto-16α,17α-dihydroxy-progesterone;

1β,16α,17α-trihydroxy-1-dehydro-progesterone;
11-keto-16α,17α-dihydroxy-progesterone;
9α-halogen-11β,16α,17α-trihydroxy-progesterone;
9α-halogen-16α,17α-dihydroxy-11-ketoprogesterone;
9α-halogen-11β,16α-17α-trihydroxy-1-dehydro-progesterone;
12α-halogen-11β,16α,17α-trihydroxy-progesterone;
21-halogen-11β,16α,17α-trihydroxy-1-dehydro-progesterone;
21-halogen-11β,16α,17α-trihydroxy-progesterone;
21-halogen-11β,16α,17α-trihydroxy-1-dehydro-progesterone;
9α,21-dihalogen-11β,16α,17α-trihydroxy-progesterone;
16α-hydroxy112α-alkyl-hydrocortisone;
16-hydroxy-12α-alkyl-cortisone;
16α-hydroxy-9α-methyl-hydrocortisone;
16α-hydroxy-9α-methyl-cortisone;
16α-hydroxy-12α-methyl-prednisolone;
16α-hydroxy-12α-alkyl-prednisone;
16α-hydroxy-9α-methyl-prednisolone;
16α-hydroxy-9α-methyl-prednisone;
12α-alkyl-11β,16α,17α-trihydroxy-progesterone;
9α-methyl-11β,16α,17α-trihydroxy-progesterone;
12α-alkyl-11-keto-16α,17α-dihydroxy-progesterone;
9α-alkyl-11-keto-16α,17α-dihydroxy-progesterone;
12α-alkyl-pregna-4,6-diene-11β,16α,17α-triol-3,20-dione;
9α-alkyl-pregna-4,6-diene-11β,16α,17α-triol-3,20-dione;
12α-alkyl-pregna-1,4-diene-11β,16α,17α-triol-3,20-dione;
9α-alkyl-pregna-1,4-diene-11β,16α,17α-triol-3,20-dione;
12α-alkyl-pregna-1,4-diene-16α,17α-diol-3,11,20-trione;
9α-alkyl-pregna-1,4-diene-16α,17α-diol-3,11,20-trione;
9α-alkyl-pregna-1,4,6-triene-11β,16α,17α-triol-3,20-dione;
12α-alkyl-pregna-1,4,6-triene-11β,16α,17α-triol-3,20-dione;
12α-alkyl-pregn-4-ene-11α,16α,17α,21-tetrol-3,20-dione;
9α-alkyl-pregn-4-ene-11α,16α,17α,21-tetrol-3,20-dione;
12α-alkyl-pregna-1,4-diene-11α,16α,17α,21-tetrol-3,20-dione;
9α-alkyl-pregna-1,4,-diene-11α,16α,17α,21-tetrol-3,20-dione;
12α-alkyl-pregn-4-ene-11α,16α,17α-triol-3,20-dione;
9α-alkyl-pregn-4-ene-11α,16α,17α-triol-3,20-dione;
12α-alkyl-pregna-1,4-diene-11α,16α,17α-triol-3,20-dione;
9α-alkyl-pregna-1,4-diene-11α,16α,17α-triol-3,20-dione;
14α-hydroxy-progesterone;
1α,5α-epidithio-pregnane-3,20-dione;
allopregnane-3,20-dione;
4-chloro-pregn-4-ene-3,20-dione;
5α-cyano-pregnane-3,20-dione;
16α-cyano-pregna-1,4-diene-3,20-dione;
11α-allyl-11β-hydroxy-progesterone;
19-nor-progesterone;
1α-acetyl-thio-pregn-4-ene-3,20-dione;
16,17-epoxy-progesterone;
6α-methyl-progesterone;
6α-nitro-progesterone;
6α-methyl-pregna-4,6-diene-3,20-dione;
11-keto-progesterone;
16α-cyano-methyl-progesterone;
pregn-4-ene-3,20-dione-21-ol;
21-nor-progesterone and the corresponding esters.
Suitable starting materials are furthermore the salts of the 3,17-bis-guanyl-hydrazones of, for example:

11α-hydroxy-androstane-3,17-dione;
11α-hydroxy-androsta-1,4-diene-3,17-dione;
1α,2α-epoxy-androstane-3,17-dione;
6α-fluoro-androsta-1,4-diene-3,17-dione;
1α-acetylthio-androst-4-ene-3,17-dione;
androst-4-ene-3,11,17-trione;
6α-methyl-androst-4-ene-11β-ol-3,17-dione;
7α-acetylthio-androst-4-ene-3,17-dione;
9α-fluoro-androst-4-ene-11β-ol-3,17-dione;
19-nor-androst-4-ene-3,17-dione;
4-chloro-androst-4-ene-3,17-dione;
5α-cyano-androstane-3,17-dione;
aetiocholane-3,17-dione;
14α-hydroxy-androst-4-ene-3,17-dione and the corresponding esters.
Other suitable starting materials are, for example, the salts of:

3,5-cyclo-pregnane-6,20-bis-guanylhydrazone;
16-cyano-pregna-3,5-diene-7,20-bis-guanylhydrazone;
pregna-3,5-diene-7,20-bis-guanylhydrazone;
pregn-4-ene-11-one-3,6,20-tris-guanylhydrazone;
pregn-5-ene-ol-7,20-bis-guanylhydrazone;
the bis-guanylhydrozone of 2-formyl-androst-4-ene-17β-ol-3-one;
the bis-guanylhydrazone of 2-formyl-17α-methyl-androst-4-ene-17β-ol-3-one;
pregnane-3,6,20-tris-guanylhydrazone;
cholestane-3,6-bis-guanylhydrazone;
androsta-3,5-diene-7,17-bis-guanylhydrazone;
pregn-4-ene-3,6,20-tris-guanylhydrazone;
the bis-guanylhydrazone of 2-formyl-pregn-4-ene-20β-ol-3-one;
3,5-cyclo-androstane-6,17-bis-guanylhydrazone;
the bis-guanylhydrazone of 16-formyl-androst-5-ene-3β-ol-17-one;
the 3',3',20-tris-guanylhydrazone of pregn-4-ene-2-(3'-ketobutyl)-3,20-dione;
the 3,3'-bis-guanylhydrazone of androst-4-ene-2-(3'-ketobutyl)-17β-ol-3-one;
the bis-guanylaydrazone of 17-formyl-androst-4-ene-3-one;
the 3,3'-17-tris-guanylhydrazone of androst-4-ene-2-(3'-ketobutyl)-3,17-dione;
androst-4-ene-(2,3)-cyclohex-4'-ene-3',17-bis-guanylhydrazone;
the 3,3'-bis-guanylhydrazone of pregn-4-ene-2-(3'-ketobutyl)-20β-ol-3-one;
the 3',17-bis-guanylhydrazone of androst-5-ene-16-(3'-ketobutyl)-3β-ol-17-one;
pregn-4-ene-(2,3)-cyclohex-4'-ene-3',20-bis-guanylhydrazone;
androst-4-ene-(16,17)-cyclohex-17(20)-ene-3,21-bis-guanylhydrazone.

The above-mentioned compounds of the pregnane and androstane series represent typical examples of substances which are suitable as starting materials. In addition, steroids containing more than one guanylhydrazone group in any position in the nucleus (e.g. 1,3-; 1,5-; 1,6-; 1,7-; 1,11-; 1,12-; 1,15-; 1,17-; 2,3-; 2,5-position, etc.) and/or in condensed side chains, are generally suitable as starting products for the invention. The steroid of the pregnane and androstane series used as starting materials can be saturated as well as mono- or poly-unsaturated compounds. As to their steric conditions, they can be linked with the rings A,B—B,C and C,D in the cis- or trans-form.

They can be homo-, nor- or cyclo-compounds and some carbon atoms of the steroid structure can be replaced by hetero atoms, such as nitrogen, oxygen or sulphur atoms. The steroid structure can also be substituted in any way by suitable radicals, such as OH, O-alkyl, O-acyl, O-sulphonyl, O-phosphonyl, epoxy, O—NO, O—NO$_2$, NRR$_1$, NO, NO$_2$, CN, Halogen, alkyl, alkenyl, alkinyl, acyl, cycloalkyl, aryl, SH, S-alkyl, S-acyl, COOR, alkyl-COOR, amide, sulphonamide, etc., or by cycloaliphatic or aromatic rings fused in any desired position.

The invention is further illustrated by the following non-limitative examples:

*Example I*

2.5 grams of the dihydrochloride of pregnane-3,20-bis-guanylhydrazone are dissolved in 400 ml. of glacial acetic acid and 50 ml. of water. The solution is treated with 0.6 g. of platinum oxide and hydrogenated at 40° C. under normal pressure, while stirring. When the calculated amount of hydrogen has been taken up, the solution is filtered and evaporated to dryness in a vacuum. The residue is dissolved in methanol, the solution stirred into ether, the precipitate is filtered off with suction and recrystallized from alcohol. 1.5 grams of the dihydrochloride of pregnane-3,20-bis-aminoguanidine of M.P. 290° C. (decomp.) are obtained.

In analogous manner there are prepared:

The dihydrochloride of allopregnane-3,20-bis-aminoguanidine of M.P. 283–285° C. (decomposition).

The trihydrochloride of pregnane-3,6,20-tris-aminoguanidine of M.P. 220–223° C. (decomposition).

*Example II*

5 grams of the dihydrochloride of pregn-4-ene-3,20-bis-guanyl-hydrazone are dissolved in 750 ml. of glacial acetic acid and 150 ml. of water, 1 g. of platinum oxide is added and the solution hydrogenated at 50° C. under normal pressure, while stirring. After 5 hours, the solution is filtered off from the catalyst and evaporated to dryness in a vacuum. The residue is taken up with ethanol and the filtered solution stirred into ether. The precipitated flakes are filtered off with suction, boiled with acetone and recrystallized from ethanol.

2 grams of the dihydrochloride of pregnane-3,20-bis-aminoguanidine of M.P. 288–290° C. (decomp.), are obtained.

In analogous manner there are prepared:

The dihydrochloride of pregnane-11α-ol-3,20-bis-aminoguanidine of M.P. 294–296° C. (decomp.)

The dihydrochloride of pregnane-11β,17α,21-triol-3,20-bis-aminoguanidine of M.P. 212° C. (decomp.)

The dihydrochloride of B-nor-pregnane-3,20-bis-aminoguanidine of M.P. 280–282° C. (decomp.)

*Example III*

4 grams of the dihydrochloride of androst-4-ene-3,17-bis-guanyl-hydrazone are dissolved hot in 500 ml. of glacial acetic acid, the solution is treated with 1 g. of platinum oxide and hydrogenated at 55° C. under normal pressure, while stirring. After about 5 hours, the solution is filtered off from the catalyst, evaporated to dryness in a vacuum, and the residue is boiled with ethanol.

1 gram of the dihydrochloride of androstane-3,17-bis-aminoguanidine of M.P. >360° C. is obtained.

In analogous manner there are prepared:

The dihydrochloride of androstane-7,17-bis-aminoguanidine of M.P. 300–302° C. (decomp.).

The dihydrochloride of 19-nor-androstane-3,17-bis-aminoguanidine of M.P. 268° C. (decomp.).

The dihydrochloride of androstane-(2,3)-cyclohexane-3',17-bis-aminoguanidine of M.P. 274–276° C. with decomposition.

*Example IV*

5 grams of pregn-4-ene-3,20-bis-guanyl-hydrazone dihydrochloride are hydrogenated in methanol at 90° C. and at 70–80 atmospheres with Raney nickel which was previously washed neutral with methanol. The catalyst is then filtered off and the filtrate concentrated. The dihydrochloride is precipitated with ethereal hydrochloric acid and recrystallized from ethanol/ether. The dihydrochloride of pregnane - 3 - aminoguanidine-20-guanylhydrazone thus obtained melts at 237° C.

UV: $(E_{1\ cm.}^{1\%})_{230\ m\mu} = 270$

*Example V*

3 grams of the tetrahydrochloride of pregnane-3,20-bis-[1'-(β-diethylaminoethyl)-guanylhydrazone] are dissolved in 100 ml. of acetic acid, mixed with 1 gram of platinum oxide and hydrogenated under normal pressure at 50° C. After 5 hours the catalyst is filtered off, fresh catalyst is added and the hydrogenation continued. After 2 more hours, the catalyst is filtered off and the filtrate is evaporated to dryness under vacuum. The residue is dissolved in ethanol and the solution is added to ether with stirring. One then decants, dissolves the viscous residue in alcohol and adds it to acetone with stirring. The precipitated flakes are filtered under suction and reprecipitated from alcohol/acetone.

The yield is 1 gram of the tetrahydrochloride of pregnane-3,20-bis[1'-(β-diethylaminoethyl)] - aminoguanidine having a melting point of 158° to 160° C. with decomposition.

*Example VI*

2 grams of pregn-4-ene-3,20,-bis-(1'-ethylguanylhydrazone)-dihydrochloride are dissolved in 300 ml. of acetic acid and 10 ml. of water, mixed with 0.5 gram of platinum oxide and hydrogenated under normal presure at 50° C. After about 2 hours the catalyst is filtered off, fresh catalyst is added and the hydrogenation continued. When the hydrogen uptake is ended, the reaction mixture is filtered, the filtrate is evaporated to dryness under vacuum, the residue is dissolved in alcohol and the solution is added to ether with stirring. One then decants, triturates the viscous residue with acetone, suction filters the resulting crystals and boils with acetone.

The yield is 0.8 gram of the dihydrochloride of 5α-pregnane-3,20-bis-(1' - ethylaminoguanidine) having a melting point of 244° C. with decomposition.

What is claimed is:

1. A compound selected from the group consisting of 3,17; 6,17 and 7,17 steroid aminoguanidines of the androstane series, 3,20; 6,20; 7,20 and 3,6,20 steroid aminoguanidines of the pregnane series, 3,17 steroid aminoguanidines of the androstane series which are substituted in the aminoguanidine moiety by alkyl or dialkylaminoalkyl, 3,20 steroid aminoguanidines of the pregnane series which are substituted in the aminoguanidine moiety by alkyl or dialkylamino and their salts with non-toxic pharmaceutically acceptable organic and inorganic acids.

2. The dihydrochloride of pregnane - 3,20-bis-aminoguanidine.

3. The dihydrochloride of allopregnane-3,20-bis-aminoguanidine.

4. The trihydrochloride of pregnane-3,6,20-tris-aminoguanidine.

5. The dihydrochloride of pregnane-3,20-bis-aminoguanidine.

6. The dihydrochloride of pregnane-11α-ol-3,20-bis-aminoguanidine.

7. The dihydrochloride of pregnane-11β,17α,21-triol-3,20-bis-aminoguanidine.

8. The dihydrochloride of B-nor-pregnane-3,20-bis-aminoguanidine.

9. The dihydrochloride of androstane-3,17-bis-aminoguanidine.

10. The dihydrochloride of androstane-7,17-bis-aminoguanidine.

11. The dihydrochloride of 19-nor-androstane-3,17-bis-aminoguanidine.

12. The dihydrochloride of androstane-(2,3) - cyclohexane-3',17-bis-aminoguanidine.

13. The dihydrochloride of pregnane-3-aminoguanidine-20-guanylhydrazone.

14. The tetrahydrochloride of pregnane-3,20-bis-[1'-(β-diethylaminoethyl)]-aminoguanidine.

15. The dihydrochloride of 5α-pregnane-3,20-bis-(1'-ethylaminoguanidine).

No references cited.

LEWIS GOTTS, *Primary Examiner.*

H. A. FRENCH, *Assistant Examiner.*